US012206705B2

(12) United States Patent
Kagan et al.

(10) Patent No.: US 12,206,705 B2
(45) Date of Patent: Jan. 21, 2025

(54) PHISHING PROTECTION METHODS AND SYSTEMS

(71) Applicant: Cyberfish LTD., Beer-Sheva (IL)

(72) Inventors: Dmitry Kagan, Kfar-Saba (IL); Evgeni Geht, Rehovot (IL)

(73) Assignee: COFENSE CYBERFISH LTD., Beer-Sheva (IL)

( * ) Notice: Subject to any disclaimer, the term of this patent is extended or adjusted under 35 U.S.C. 154(b) by 497 days.

(21) Appl. No.: 17/297,327

(22) PCT Filed: Nov. 26, 2019

(86) PCT No.: PCT/IL2019/051288
§ 371 (c)(1),
(2) Date: May 26, 2021

(87) PCT Pub. No.: WO2020/110109
PCT Pub. Date: Jun. 4, 2020

(65) Prior Publication Data
US 2022/0030029 A1    Jan. 27, 2022

Related U.S. Application Data

(60) Provisional application No. 62/771,275, filed on Nov. 26, 2018.

(51) Int. Cl.
H04L 9/40    (2022.01)
G06N 3/08    (2023.01)
(52) U.S. Cl.
CPC ........... *H04L 63/1483* (2013.01); *G06N 3/08* (2013.01)

(58) Field of Classification Search
CPC ... H04L 63/101; H04L 63/1483; H04L 67/02; G06F 21/44; G06F 2221/2119; G06N 3/08
See application file for complete search history.

(56) References Cited

U.S. PATENT DOCUMENTS 8,448,245 B2    5/2013  Banerjee et al.  ............... 726/22
9,621,566 B2    4/2017  Gupta et al.
(Continued)

FOREIGN PATENT DOCUMENTS

WO    2020/110109 A1    6/2020    ............. G06F 21/16

OTHER PUBLICATIONS

Catalin Cimpanu. "What is a Headless Browser, and What's It Good For?" artcile dated Jun. 24, 2015 (2 pages) https://news.softpedia.com/news/what-is-a-headless-browser-and-what-s-it-good-for-485162.shtml (Year: 2015).*

(Continued)

*Primary Examiner* — Joseph P Hirl
*Assistant Examiner* — Thomas A Gyorfi
(74) *Attorney, Agent, or Firm* — Slayden Grubert Beard PLLC

(57) ABSTRACT

A method and a system for phishing detection includes converting unauthenticated web content to a browser image, determining that the browser image has a visual similarity to visual characteristics of a legitimate website, determining that a top-level domain (TLD) of the unauthenticated web content is different from a TLD of the legitimate website, and responsively determining that the unauthenticated web content is a phishing attack.

30 Claims, 3 Drawing Sheets

(56) References Cited

U.S. PATENT DOCUMENTS

| | | | | |
|---|---|---|---|---|
| 2008/0046738 | A1* | 2/2008 | Galloway | H04L 63/1416 713/176 |
| 2013/0086677 | A1 | 4/2013 | Ma et al. | 726/22 |
| 2014/0173726 | A1 | 6/2014 | Varenhorst | 726/22 |
| 2017/0078327 | A1 | 3/2017 | Chen | 726/23 |
| 2017/0126730 | A1 | 5/2017 | Oberheide | 726/25 |
| 2017/0331855 | A1* | 11/2017 | Hardee | H04L 63/1483 |
| 2018/0103050 | A1 | 4/2018 | Mason | |
| 2018/0115584 | A1 | 4/2018 | Alhumaisan et al. | |

OTHER PUBLICATIONS

Ire Aderinokun. "Using a headless browser to capture page screenshots" article dated Nov. 22, 2018 (7 pages) https://bitsofco.de/using-a-headless-browser-to-capture-page-screenshots/ (Year: 2018).*

Ariya Hidayat. "PhantomJS Screen Capture" article dated Jan. 14, 2017 as verified by Internet Archive (3 pages) https://web.archive.org/web/20170114085703/http://phantomjs.org/screen-capture.html (Year: 2017).*

Eric Bidelman. "Getting Started with Headless Chrome" Article published Apr. 27, 2017 (16 pages) https://developer.chrome.com/blog/headless-chrome/ (Year: 2017).*

Seth Ladd. "Keeping up with HTML5 and browser support" Article published Oct. 12, 2011 (2 pages) https://developer.chrome.com/blog/keeping-up-with-html5-and-browser-support (Year: 2011).*

"When can i use . . . : Compatibility tables for support of HTML5, CSS3, SVG, and more in desktop and mobile browsers" Article dated Jul. 8, 2011 as verified by Internet Archive (9 pages) http://web.archive.org/web/20110708180148/https://caniuse.com/#cats=HTML5 (Year: 2011).*

International Search Report and Written Opinion, Application No. PCT/IL2019/051288, 16 pages, Mar. 18, 2020.

Extended European Search Report, Application No. 19890639.8, 7 pages, Jul. 12, 2022.

* cited by examiner

PHISHING PROTECTION METHODS AND SYSTEMS

CROSS-REFERENCE TO RELATED APPLICATIONS

This application is a U.S. National Stage Application of International Application No. PCT/IL2019/051288 filed Nov. 26, 2019, which designates the United States of America, and claims priority to U.S. Application No. 62/771,275 filed Nov. 26, 2018. the contents of which are hereby incorporated by reference in their entirety.

FIELD OF THE INVENTION

The invention generally relates to internet security and in particular to detected malicious messages and websites.

BACKGROUND

A "phishing" attack is an attempt to steal personal information (such as login information, banking details, or credit card numbers) by presenting a computer user with a false webpage that impersonates a legitimate webpage and which transfers to the phishing attacker any information that the user enters on the webpage. Attacks may be exploited to disrupt business operations, to introduce malware into computer systems, to steal intellectual property, to facilitate identity theft, and to extort ransom. Banks, as well as other popular sites, such as PayPal and government tax departments, are popular targets of attacks. Although organizations often deploy multiple layers of security technologies to prevent, to detect, and to respond to phishing attacks, such attacks are still among the most common form of cyberattack that organizations face.

A phishing attack is usually initiated by sending a communication such as a text message, an email, or an in-app notice to an unsuspecting user. The message encourages the user to follow a link to a webpage provided by the attacker, which deceives the user into entering personal information. The webpage may then open a legitimate provider's webpage in order to hide the fact that information has been stolen.

Common methods of stopping phishing such as maintaining "blacklists" of phishing web sites, or maintaining IP reputation and keywords, have limited utility, as attackers constantly create new phishing attacks and new domains from which to deliver the attacks. Organizations may try to rely on training employees to avoid phishing attacks, but this also has limited value, especially as perpetrators of phishing attacks continue to improve their techniques.

SUMMARY

Embodiments of the present invention provide methods and systems for phishing detection, implemented by a computer system having a processor and a memory including instructions that when executed on the processor perform the method, which includes: acquiring a set of legitimate web content from each of one or more webpages of each of a set of legitimate top level domains (TLDs); generating from each set of legitimate web content a set of legitimate browser images; determining from each set of legitimate browser images a group of legitimate visual characteristics; receiving unauthenticated web content addressed to a content recipient; generating from the unauthenticated web content a new browser image; identifying a similarity between an unauthenticated web content visual characteristic in the new browser image and at least one legitimate visual characteristic from the groups of legitimate visual characteristics, and responsively recording that the unauthenticated web content is illegitimate, i.e., a phishing attack. Recording the unauthenticated web content as a phishing attack may include one or more of recording the phishing attack, sending a modification of the unauthenticated web content to the content recipient, transmitting a warning message, and adding an entry with a TLD of the unauthenticated web content to a phishing blacklist database.

Alternatively or additionally, the method may further including recording that the unauthenticated web content is a phishing attack only after determining that an unauthenticated web content visual characteristic is not identical to a legitimate visual characteristic but has a statistical similarity to a visual characteristic of a known phishing attack. In some embodiments, the TLD of the unauthenticated web content may be the TLD of the legitimate visual characteristic.

Determining the group of legitimate visual characteristics may include generating a similarity model, and generating the similarity model may include receiving phishing content from phishing website URLs and phishing kits; generating from the phishing content a respective set of phishing browser images; and performing a manual review by a human operator to segment and classify the set of phishing browser images.

Determining the group of legitimate visual characteristics may include generating a similarity model, and generating the similarity model may include receiving phishing content from phishing website URLs and phishing kits; generating from the phishing content a respective set of phishing browser images; segmenting and classifying the set of phishing browser images by an automated algorithm; and generating the similarity model as a machine learning model from the set of legitimate browser images and from the segmented and classified set of phishing browser images. The machine learning model may be a neural network (NN) model. Recording the phishing attack further may include adding the unauthenticated web content to the phishing content and re-generating the machine learning model.

The instructions may further include receiving additional unauthenticated web content, determining that the additional unauthenticated web content is not similar to a phishing attack, and has a TLD not included in the plurality of TLDs, and responsively adding the unauthenticated web content to the set of legitimate web content and re-generating the machine learning model.

In some embodiments, recording that the unauthenticated web content is a phishing attack may be performed only after determining that the unauthenticated web content includes interactive fields configured to receive user information. Alternatively or additionally, determining that the unauthenticated web content is a phishing attack may include determining that graphics of the unauthenticated web content are not in a graphics blacklist. Receiving the unauthenticated web content may include receiving a communication that is one of a text message, an email, or an in-app notice, at a server configured to provide a user device with access to the communication. Alternatively or additionally, receiving the unauthenticated web content may include receiving, at a messaging client on a user device, a communication that is one of a text message, an email, or an in-app notice. In addition, receiving the unauthenticated web content may include receiving web page content by simulating a user interaction on previously received unauthenticated web content. Simulating a user interaction on previously received unauthenticated web content may include simulating a mouse movement, a mouse click or a keystroke to access a link to the unauthenticated web content.

In some embodiments, generating the legitimate browser images and the new browser image may include processing the respective legitimate and unauthenticated web content with an HTML5-compatible background browser and storing respective outputs of the HTML5-compatible background browser to the memory of the computer system, wherein the background browser creates an image identical to a browser configured to display HTML5 content on an interactive screen. Each browser image may be a bit-map image.

The method may further include receiving second unauthenticated web content and, in response to determining that a URL of the second unauthenticated web content is on a URL blacklist, recording a second phishing attack. The unauthenticated web content may include a button, dialog box or animation linking to an unauthenticated URL, where the unauthenticated URL includes second unauthenticated web content, and converting the unauthenticated web content to the new browser image may include converting the second unauthenticated web content to the new browser image. The method may further include recording the phishing attack in response to determining that 1) the new browser image has no similarity to an image of the set of legitimate browser images, that 2) the second unauthenticated web content includes no links to additional URLs, and that 3) the second unauthenticated web content includes at least one of a reference to a monitored brand or an interactive field configured to receive user information. The monitored brand may be a brand logo image.

Some embodiments may further include: receiving second unauthenticated web content; converting the second unauthenticated web content to a second browser image and generating a safe link notice in response to determining that the second browser image has no similarity to an image of the set of legitimate browser images, that the second webpage includes no links to additional URLs, and that the second webpage includes neither a reference to a monitored brand nor an interactive field configured to receive user information.

Additional embodiments may include receiving the unauthenticated web content from a message server, receiving from the message server additional content, determining from the additional content a characteristic of content familiar to a content recipient, generating test phishing content that includes the characteristic of familiar content, and delivering the test phishing content as a message to the content recipient.

Further embodiments of the present invention provide a method (implemented by a computer system having a processor and a memory comprising instructions that when executed on the processor perform the method) that includes receiving phishing content from phishing web site URLs and phishing kits; generating from the phishing content a respective set of phishing browser images; determining from each set of phishing browser images a group of phishing visual characteristics; receiving unauthenticated web content addressed to a content recipient; generating from the unauthenticated web content a new browser image; identifying a similarity between an unauthenticated web content visual characteristic in the new browser image and at least one phishing visual characteristic from the groups of phishing visual characteristics; and responsively recording that the unauthenticated web content is illegitimate, i.e., a phishing attack.

Determining from each set of phishing browser images a group of phishing visual characteristics may include segmenting and classifying the set of phishing browser images. The phishing visual characteristic may include a reference to a monitored brand and an interactive field configured to receive user information.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

Figure 1:
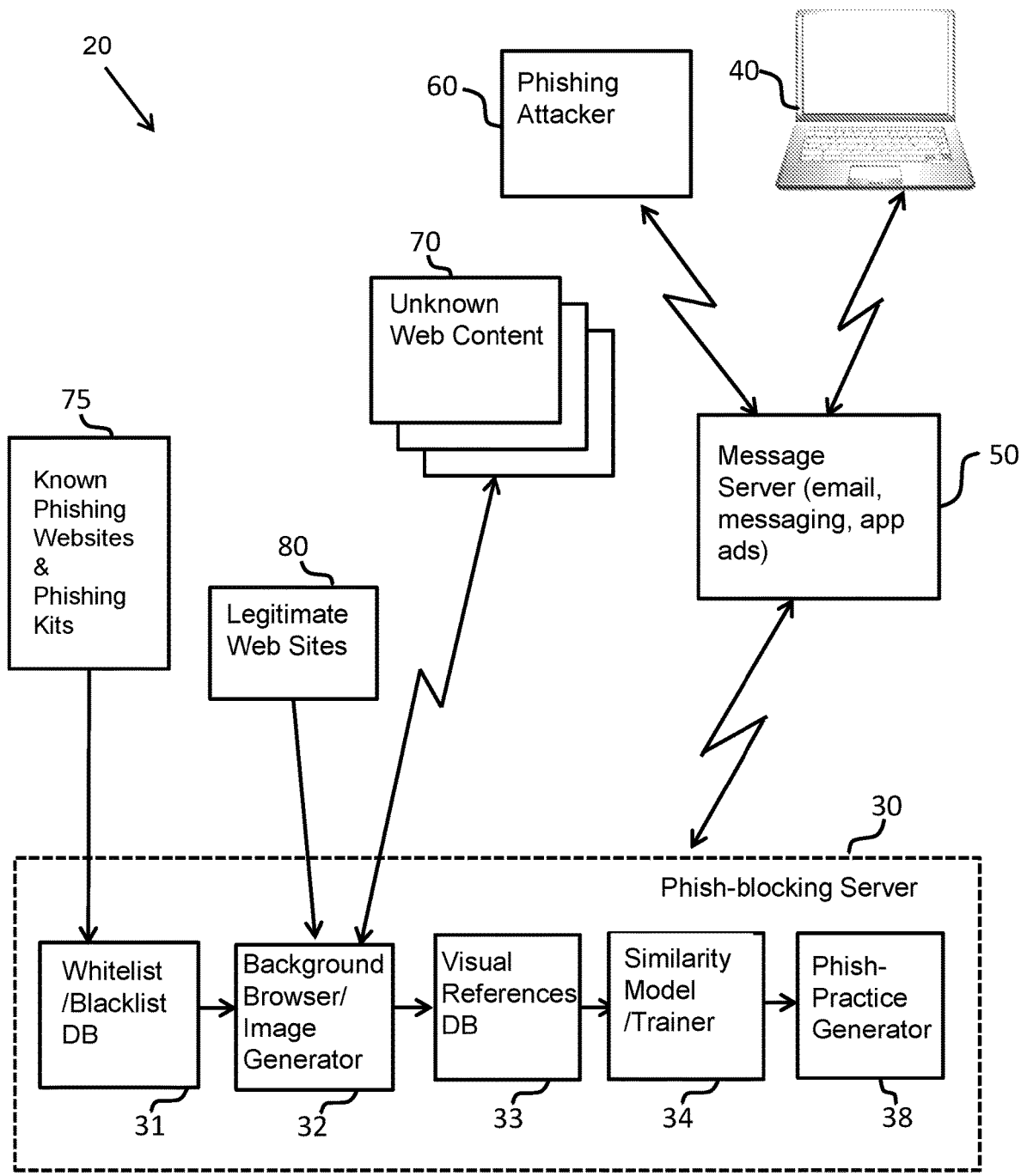
FIG. 1 is a schematic diagram of a system for detected phishing attempts, according to some embodiments of the present invention.

It is to be understood that the invention and its application are not limited to the methods and systems described below or to the arrangement of the components set forth or illustrated in the drawings, but are applicable to other embodiments that may be practiced or carried out in various ways.

Embodiments of the present invention provide methods and systems for protecting users and their organizations from phishing attacks, by detecting new, "zero-hour" phishing attacks and by blocking those attacks and/or issuing warnings. Methods and systems of the present invention may provide warnings to users, when a suspicious message is received, that extra care is required to validate the message source and to be certain that the message does not include phishing threats. Additional predefined actions may be applied automatically, such us moving a suspicious message to quarantine. In addition, embodiments of the present invention provide means for tracing Uniform Resource Locators (URL) references in a webpage that may hide attacks through several layers of URL redirects.

FIG. 1 is a schematic diagram of a system 20 for detected phishing attempts, according to some embodiments of the present invention. The system includes a computer-based, phish-blocking server 30, which includes software and hardware configured to protect an end-user device 40 (such as a mobile device or desktop computer) from phishing attacks. The end-user device 40 typically includes a messaging client application that permits a user to view received messages. Phishing attacks may be delivered through a variety of message types, corresponding to the variety of client applications that users may employ. Client applications may include mobile device messaging apps (such as WhatsApp, Skype, or SMS text), emails, or in-app messages, such as messages delivered as advertisements in games. Phishing messages may include links to web content (i.e., webpages), or may themselves be "web content" in that they are provided in a web-compatible format, such as Hypertext Markup Language (HTML), including specific HTML versions, such as HTML5.

As indicated in the figure, the end-user device 40 typically receives messages from a message server 50 that is specific to the type of message delivered. For example, the message server 50 may be a messaging app server, an email server, or an ad server.

In embodiments of the present invention, the phish-blocking server 30 is designed to receive messages (including emails) from the message server 50 before the messages are delivered to the client application on the end-user device 40. Typically the phish-blocking server 30 accesses these messages through a secure application programmer interface (API) of the message server 50.

A phishing attacker 60 initiates an attack by delivering a phishing message addressed to a particular user, which is typically received by the message server 50 before reaching the client application. Like other messages, the phishing message may include links to web content (i.e., webpages), or may itself be "web content" prepared in a web-compatible format. In either case, either the message content or the linked content of the phishing message may be "phishing content", that is, content that impersonates a site of a brand or person, and which is designed to deceive the user into sending user information to the attacker. (User information may include: account information for accessing legitimate websites, such as email account credentials, bank account details, social media account information, other sensitive information or even money transfers.)

In embodiments of the present invention, the phish-blocking server 30 receives a new message from the message server, determines whether or not the message includes phishing content, and may then modify the message before permitting its delivery to the user. Modifications may include: adding warning notifications regarding whether or not the message is safe, deletion of dangerous content or links, deletion of messages, or labelling of messages for special processing by client applications. Additional processing may also include notifying a monitoring application and/or an administrator of the threat, and/or moving the message to a "quarantine" repository.

Processing by the phish-blocking server may include operations by four subsystems: a whitelist/blacklist database 31, a background browser 32, a visual references database 33, and a similarity model 34. In some embodiments, the message server 50 may also be a component of the phish-blocking server 38.

The whitelist/blacklist database 31 may be configured to store URLs and content, including assets and the visual representation, of known phishing websites and phishing "kits" 75 (which are added to a backlist) as well as legitimate webpages and websites 80, added to the whitelist. (Hereinbelow, "assets" refer to web page content that visually appears to the recipient. Content may be textual, including images that present textual content, such as senders' names, email addresses, phone numbers, email TLDs, and account names. Assets may also include hypertext links that could also identify a source of the web content.) Blacklist websites may be websites known by other services to have a role in phishing attacks. Blacklist sites may also include websites determined by the phish-blocking server to have had a role in phishing attacks. Content of both blacklist and whitelist webpages are recorded in the database and then processed by the background browser 32, which generates images from the content. Subsequently, the image content, together with metadata (such as brand name, company name, and TLD), is applied to generate a similarity model machine learning model that filters phishing content, as described below.

The background browser 32 generates images that are "visual" representations of content, meaning representations of how that content would appear on the display of the end-user device 40 if the new message were opened by the user. The background browser 32, as opposed to a regular browser, does not display content on an interactive display, but instead stores visual representations, that is, "browser images" of content, for subsequent, automated image processing and classification. The browser images may be generated, for example, as image bit-maps that are identical to image bit-maps that would appear on a user's graphic display when a given message and its linked webpages are opened by a recipient in the recipient's email or web browser application. The background browser may also be configured to generate images with different characteristics such height, width, and resolution, and reflecting how the web content would appear in different browsers, such as Chrome, Safari, Firefox, UC, and Internet Explorer. Images may also be generated conforming to different platforms, such as mobile devices and desktop screens.

The background browser 32 processes both the messages received by the message server 50, as well any web content 70 provided by URL links in the messages. The background browser may request that web content 70 ("unknown web content") by communicating directly with the linked websites according to the URLs. Images generated by the background browser 32 are then stored in the visual references database 33. Typically several webpages for a given website are scanned to create a set of browser images. The browser images may be stored as bit-mapped images or by other image formats, and may be stored together with the associated webpage URL information in the database 33. Typically, the background browser is configured to process HTML5-compatible web content.

Image processing and classification algorithms, typically of a rules-based engine or a machine learning (ML) subsystem (such as a neural network) are applied to generate a similarity model 34 from the generated browser images and the metadata (metadata being brand names and brand domain names, such as TLDs, associated with those images). A visual comparison model is trained to identify common visual characteristics of browser images of webpages related to a single website or brand. (Hereinbelow, a "website" refers to a collection of webpages having a common top-level domain or representing a single organization or "brand".)

The similarity model 34 may be trained with multiple sets of webpage images, each set representing a single website, brand, or person. Typically the similarity model is trained with webpages of a wide range of legitimate websites, covering most websites with which a target group of users might interact. Training serves to generate a model that can subsequently be applied to identify visual similarities between legitimate or "branded" websites and a new, unauthenticated webpage (i.e., a webpage linked or presented by a recipient message). Known phishing content that impersonates legitimate web content may also be used in the training of the similarity model, as described below with respect to FIG. 3. When a new message to be validated is received by the phishing server, the background browser generates images of web content from a new message, and the similarity model 34 is applied to check whether there is a visual similarity between a style or layout of the content and any of the websites used to train the ML model. If there is a visual similarity, and if the domain of the similar website is not the domain from which the message content was retrieved (typically, but not necessarily, the TLDs are compared), the phish-blocking server may determine that the message is a phishing attack. "Visual similarity" of webpages may be determined as a statistical measure of feature similarity, i.e., a probability of a match, similar to the statistical measures used by neural network models for other types of image recognition, such as facial recognition.

As described below with respect to FIG. 3, the similarity model may be trained as a neural network with both legitimate and phishing website input, which provides a range of visual variation of impersonation (i.e., impersonation ranging from identical visual features to statistically similar features).

In further embodiments, the phish-blocking server includes a phish-practice generator 38, which generates content based on previously detected attacks, including their types and attack patterns, in order to test users' ability to avoid such content. For example, the phish-practice generator may create messages with in-message and in-link phishing-like content, such as forms for receiving sensitive user data. The phish-practice generator may also generate messages with links to webpages, which may also been generated by the phish-practice generator. The generated webpages are generated automatically by the phish-practice generator at a website maintained by administrators of the phish-blocking server for test purposes. Generated test phishing messages may be configured to impersonate sites that may be frequently visited by users of an organization. Generated test phishing messages may also be configured to appear as having been sent by people known to a given user, or, more generally, sent by people with business relations with an organization. Test phishing messages may also include links related to emails or to messages that are in the message server 50, as well as text of links, such as website URLs and email addresses that is visually similar to text found on the message server. In other words, messages from the phish-practice generator reach users without showing indications that they are from the practice generator. If a user does click on a link to a phish-practice test site, or provide personal information on such a site, the user may receive a notice of having succumbed to the phishing test. The practice generator thereby reminds users of the potential real threats that attackers try to mount against an organization. Feedback regarding users having succumbed to such test attacks may also be provided to the system administrators to help the administrators improve anti-phishing education processes.

In further embodiments the message and phish-blocking servers reside in cloud-based platforms or may be co-located in a corporate data center. In further embodiments, some or all of the functions of the phish-blocking server 30 may be installed to operate on the end-user device 40. In addition, functions of the phish-blocking server operating in the end-user device may be configured to process messages located in the client application that receives messages for display to the end-user, rather than processing messages in the message server.

Figure 2:
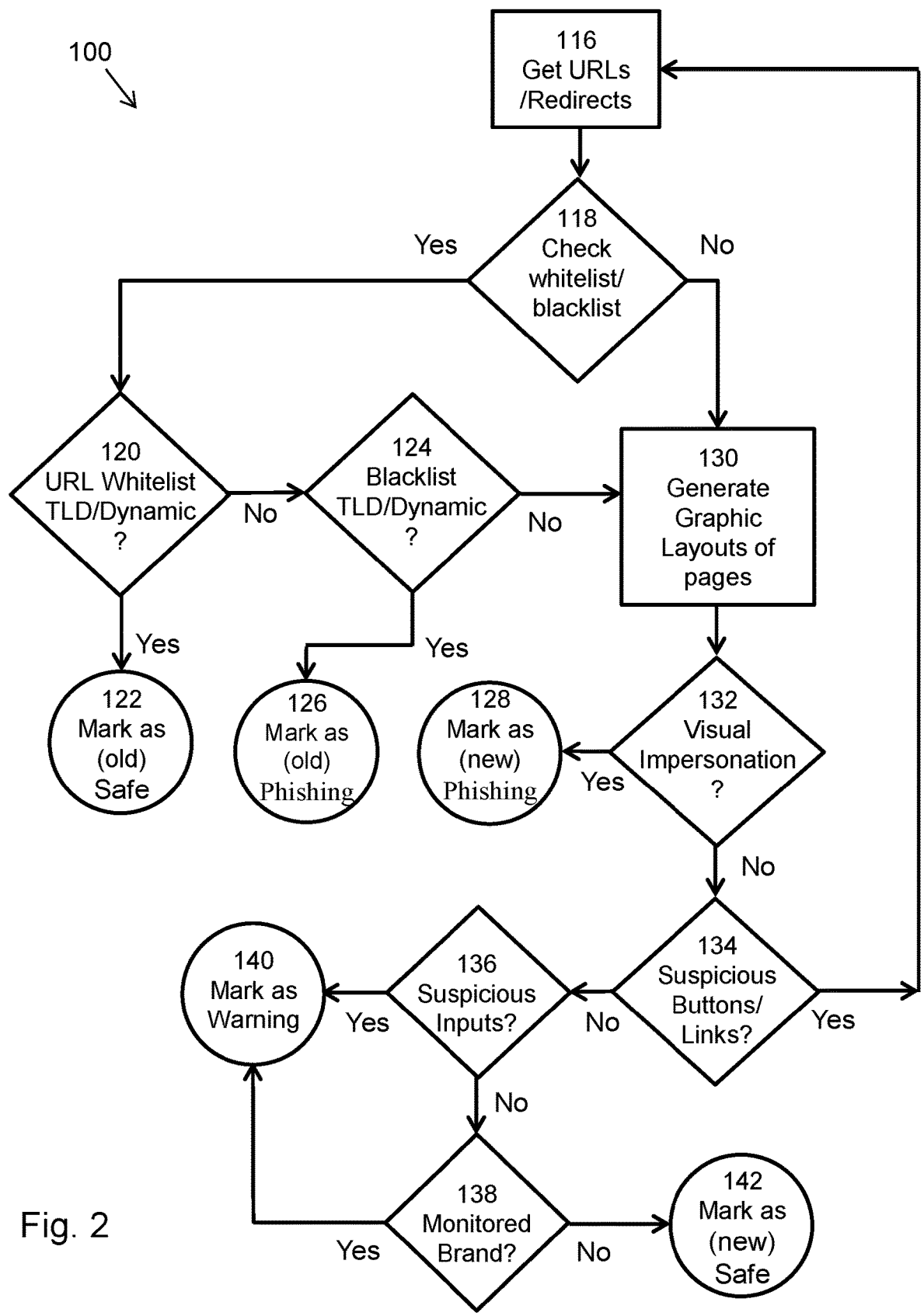
FIG. 2 is a flow diagram of a process for detected phishing attempts, according to some embodiments of the present invention.

FIG. 2 is a flow diagram of a process 100 for detected phishing attempts, implemented by the phish-blocking server 30 described above, according to some embodiments of the present invention. As described above, some or all functions of the phish-blocking server may be executed on a remote computing platform, for example on a cloud platform, or may be executed on the end-user device 40.

Typically, before performing process 100, a similarity model is trained to identify similarities between unauthenticated web content and legitimate and/or known phishing visual content. An example of such training is described below with respect to FIG. 3. Next, new messages, with new, unauthenticated web content, are received at a step 116.

A predefined setting of the system is checked at a step 118 to determine if web content should be tested for whitelist or blacklist associations, e.g., URL associations, including common legitimate and phishing TLDs. When the system is set to skip whitelist and blacklist testing, certain URLs, or URL patterns, that have a high probability of phishing risk may be set to override this setting, so that they are always tested. (An example of a URL that might be set to "always tested" would be "google.com/?url= . . . ", which is a known redirection.) If whitelist/blacklist skipping is set, a subsequently determined visual impersonation of web content may be marked as a phishing attack even when the web content is from a whitelisted TLD. This may occur, for example, when a legitimate website redirects to unknown websites in certain situations.

If checking is enabled, then at a step 120, URLs in the new message are compared with a URL whitelist, which is maintained by the phish-blocking server, as described above. If the top-level domains of all URLs linked in the new message are on the whitelist of legitimate websites, the message may be cleared, i.e., marked as being safe. In such an event, the phish-blocking server may issue a safe notice, such as modifying the new message to indicate to the user that it is safe and/or indicating to the message server that the new message is safe. The URL whitelist may include URLs (typically TLDs) derived by manual entry or from external whitelist providers. The URL whitelist may also be updated to include new URLs at the end of iterations of the process 100 when a new webpage, linked from a new message, is determined to be safe (at step 142).

If the whitelist test of the step 120 is negative, then a blacklist test of the new message may be performed at a step 124. The blacklist is typically a list of top-level domain URLs of websites that have previously been shown to have propagated cyberattacks. Lists may be provided by external providers or entered manually. New blacklist URLs may also be added when an iteration of process 100 discovers a new phishing attack website, at a step 128, described below. If TLDs of interactive links in the new message are URLs appearing in the blacklist, then the new message is marked at step 126 as a phishing message.

If the one or more URLs of the unauthenticated web content are not on the whitelists or the blacklists of the respective steps 120 and 124, then at a step 130 the background browser is employed to generate visual representations of the unauthenticated web content of the message, that is, the content of the new message itself (if in a browser-compatible format), or in URL links contained by the message.

Generated visual representations may be browser images that a regular web browser would create and present on user display, after downloading all content linked from the message or webpage. Generation of the browser images may include retrieving multiple content items for each webpage. Content items may also come from multiple websites. Often the true visual representation of a webpage is not obvious until all content is received by a browser, especially as content may overlap.

At a subsequent step 132, a test of "visual impersonation" is performed. At this step, the rules engine or similarity model 34, typically generated as a neural network, as described below with respect to FIG. 3, may compare the generated browser image of the new message or new web content with the visual characteristics of legitimate webpages and/or blacklisted webpages, to determine if the new message includes similarities indicating an impersonation attempt, meaning that the web content represents a phishing attack. Typically, a "similar" legitimate website is identified as having a statistical similarity to the unauthenticated web content, in that the statistical similarity meets a preset threshold level. First, content assets within a new message may be analyzed, according to a visual layout of the new message, to find a visual similarity to assets in legitimate messages, including messages stored in a recipient's inbox. If a similarity is identified, even if there is not an identical match, and if the TLD of the new web content is different from the TLD of the similar legitimate web content, the message is regarded as an "impersonation" and is recorded, or logged, as a phishing attack. If the message includes links, the hypertext of those links, as well as the web content at those links are also examined in an iterative process.

Website URLs and email addresses that are visually similar to text found in legitimate content, but which include small modifications, are typically marked as phishing attacks. If at least one analyzed example of web content meets the criterion of similarity to the legitimate websites, but is not located on a website have a TLD of a legitimate website, the new message may be recorded as a phishing attack, at a step 128. Website or content marked as phishing may then added to the blacklist of database 31.

Step 132 may also include a graphics blacklist review, in which graphic elements in the new message are compared with blacklist graphics appearing on known phishing sites. A blacklist graphics database may store graphics found in phishing messages or in phishing websites. Other sources of blacklist graphics are lists published by anti-phishing security firms, or graphics that appear in phishing messages or websites generated by "phishing kits" that appear in various forums for use by hackers. Blacklist graphics may be indicated, for example, by a single browser image that includes several logos and an interactive field configured to receive user information, such as a field for entering login information. Human classification may also be employed to identify blacklist graphics. When a blacklist graphic is identified in a new browser image, the new content may be identified as a phishing attack without a test of the TLD before performed (i.e., regardless of the TLD).

If the web content of the new message (the "unauthenticated content") is not similar to legitimate websites, the process 100 may perform additional tests before determining that the new message is "safe". One test, at a step 134, is to follow additional links in the initially tested webpage to additional webpages, to determine if the additional webpages impersonate legitimate websites, indicating that the new message is a phishing attack (iterating steps 116 through 132). The additional links may be followed by simulating user interaction in the background browser. Simulated interaction may include simulating a mouse movement, a mouse click and a keystroke to access the link. These interactions are performed on interactive components that would typically require human interaction to be viewed, such as "pop-up" or "hidden" types of clickable input or forms (e.g., buttons or dialog boxes), these input types may be regarded as suspicious. A separate neural network model may be configured to recognize suspicious input types. A suspicious interactive component may be indicated, for example, by proximity of the interactive component to text or an input field requesting user identification, or by an interactive component that when clicked leads to a new URL. A suspicious link to a new URL may be one that leads to a subsequent webpage, where the subsequent webpage including a suspicious input type, or where the subsequent webpage includes a reference to a monitored brand. A reference to a monitored brand may be, for example, a brand logo image. The system may be configured to record a phishing attack upon determining the existence of suspicious input types and links.

For each suspicious link identified at a step 134, the triggered URL is followed and the content of this triggered URL is processed at step 116.

Recording the phishing attack may include logging the attack for review by a system administrator (and/or security personnel), as well as modifying the unauthenticated content at the email or message server 50. It may also include transmitting a warning message or alarm to the intended recipient and/or to a system administrator. If the URL of a webpage identified as part of a phishing attack was not found on the blacklist at the step 124, the URL of the newly identified phishing webpage may also be added to the blacklist database as a proactive step for protection against subsequent messages. In a further embodiment of process 100, the step 120 may be delayed until after the test of step 132 indicates a similarity to a given legitimate website, and the TLD of the URL of the unauthenticated content may then be checked as to whether it is on the whitelist. If it is, the new message is marked as safe.

If there are no more links to follow from a given webpage, the next steps of the process 100 are to test for suspicious inputs, at a step 136, and to test, at a step 138 whether the unauthorized content includes textual or graphic references or links, to known brands, despite the dissimilarity to legitimate websites. Suspicious inputs may be tested by measuring proximity of text requesting terms such as "account", "password", "or identification" to interactive fields in the web browser-generated browser image. A machine learning model of suspicious inputs may also be applied. References to "brands" in unauthorized content may include brand logo images. If the tests of either step 136 or step 138 prove positive, the certainty of a phishing attack is less than in the case of page impersonation, but there may still be a risk. Therefore, at a step 140, the phish-blocking server may issue a warning or mark the message with a warning of a possible risk. Alternatively, step 140 generates the same alert response as described with respect to step 128 above (i.e., blacklisting a phishing attack).

If no warning messages are warranted, in that the tests of both 136 and 138 are negative, then, at a step 142 the phish-blocking server may mark the message as safe and issue a safe notice, as described above with respect to step 120. The associated TLD may also be added to the whitelist.

Figure 3:
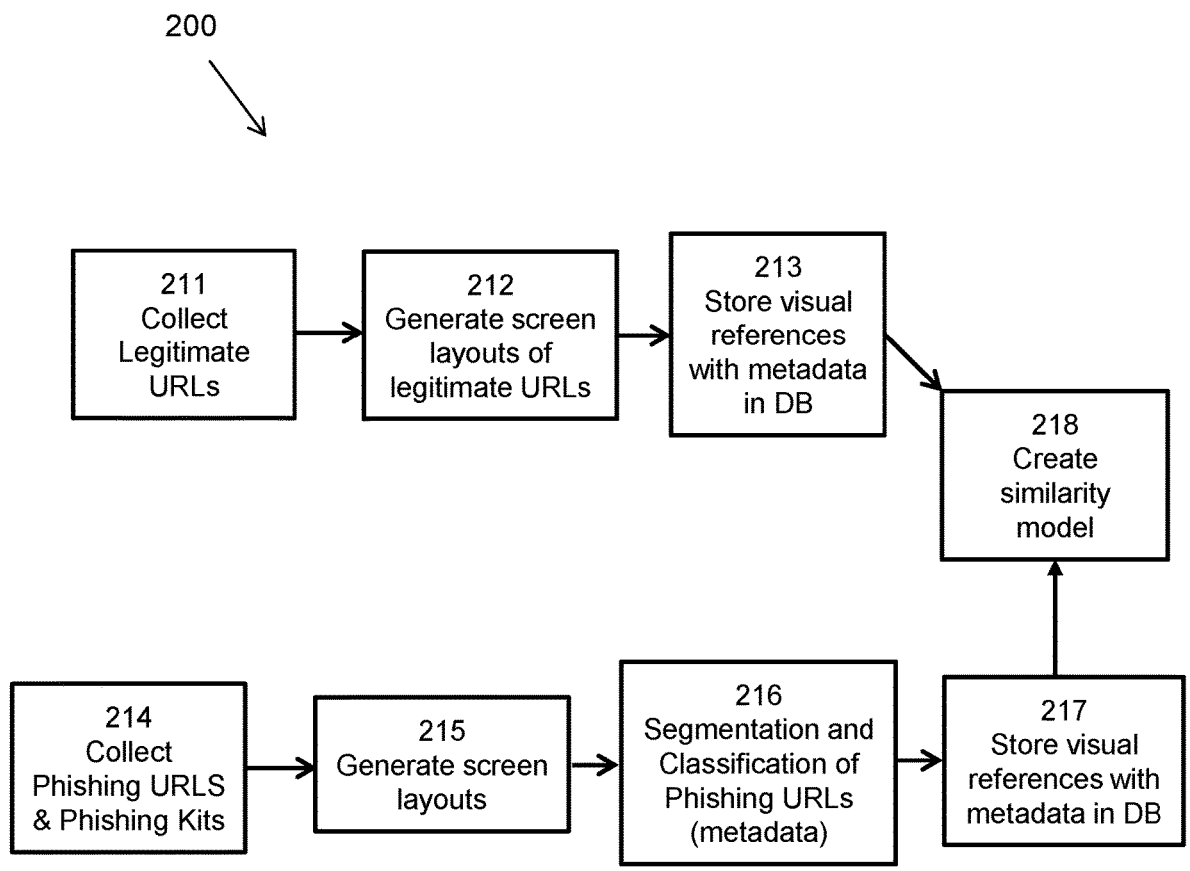
FIG. 3 is a flow diagram of a process for training a system to detect phishing attempts, according to some embodiments of the present invention.

FIG. 3 is a flow diagram of a process 200 for training the similarity model 34 to detect phishing attempts, according to some embodiments of the present invention. A legitimate Uniform Resource Locators (URL) stage of the process 200 includes three steps: a step 211 of collecting legitimate Uniform Resource Locators (URLs), a step 212 of generating layouts (visual representations or "references") of the URLs, and a step 213 of storing the visual references that are subsequently applied to a machine learning subsystem to create the similarity model for detecting phishing attempts. URLs of legitimate websites, that is, websites of known brands, are typically popular websites that maintain user accounts, such as banks, or social media websites, such as Facebook and Twitter. Such websites are typically available on internet security "whitelists". Legitimate websites may be designated by their top-level domain names (TLDs), such as www.facebook.com, or www.chase.com. Typically, each such legitimate website includes a home page, as well as multiple additional webpages, which are designated by their sub-level domain, such as creditcards.chase.com. The visual references of legitimate webpages are stored in the database together with metadata, such as brand and domain names.

In addition to legitimate websites, visual references of phishing websites built using phishing kits, as well as known phishing websites, are entered to the system, through four steps of a parallel blacklist stage of the process 200. At a step 214, references to blacklist pages are extracted from public available feeds of such phishing websites. At a step 215 layouts (i.e., visual representations or "references") of the URLs are generated. Next, at a step 216, a classification and segmentation process is applied to classify phishing websites according to parameters such as the domain and brand names being impersonated. The classification and segmentation of phishing browser images may be performed by classification and segmentation algorithms known in the art (such as k-means clustering). Classification and segmentation may also be performed manually by a human operator.

Classifications together with associated visual references are then stored in the visual reference database, at a step 217. Segmentation and classification may also be semi-manual, in that human oversight may be applied to ensure proper classifications. Also, irrelevant aspects of images may be removed (i.e., aspects that do not relate to the impersonation).

The visual references of legitimate webpages are stored in the database together with metadata, such as brand and domain names. At a step 218, the legitimate labeled visual references stored at the step 213, and the phishing labeled visual references stored at the step 217, are applied to create the similarity model 34 that differentiates between the two types of web content. As described above, the similarity model 34 is typically a neural network. During operation of the phishing server, new websites may be determined to be legitimate, and these new websites may be added to the list of legitimate websites and steps 211, 212, 213, and 218 may be repeated. Similarly, as new phishing web content is discovered, the new phishing web content may be added to the list of phishing websites and steps 214-218 may be repeated.

Method steps associated with the system 20 and with the processes 100 and 200 can be rearranged and/or one or more such steps can be omitted to achieve the same, or similar, results to those described herein. Furthermore, it is to be understood that the phraseology and terminology employed herein is for the purpose of description and should not be regarded as limiting.

All or part of the system 20 and with the processes 100 and 200 can be implemented in digital electronic circuitry, or in computer hardware, firmware, software, or in combinations thereof. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one website or distributed across multiple websites. Memory storage may also include multiple distributed memory units, including one or more types of storage media. Examples of storage media include, but are not limited to, magnetic media, optical media, and integrated circuits such as read-only memory devices (ROM) and random access memory (RAM). A computing system configured to implement the system may have one or more processors and one or more network interface modules. Processors may be configured as a multi-processing or distributed processing system. Network interface modules may control the sending and receiving of data packets over networks.

It is to be understood that the scope of the present invention includes variations and modifications thereof which would occur to persons skilled in the art upon reading the foregoing description and which are not disclosed in the prior art.

What is claimed is:

1. A computer-implemented method for detecting phishing attacks, comprising:
   acquiring a set of legitimate web content from multiple webpages hosted at a plurality of legitimate top-level domains (TLDs);
   generating, using an HTML5-compatible background browser, a set of legitimate browser images from the set of legitimate web content, wherein the legitimate browser images are bit-map images stored in memory without displaying content on an interactive display;
   determining, using a neural network, a set of legitimate visual characteristics from the set of legitimate browser images;
   accessing, by the system, a hyperlink embedded within an email message in a user's email inbox;
   generating, using the HTML5-compatible background browser, a background browser image from unauthenticated web content associated with the hyperlink;
   identifying, using the neural network, a statistical similarity between visual characteristics of the background browser image and the set of legitimate visual characteristics;
   determining that a domain of the unauthenticated web content does not match any of the plurality of legitimate TLDs associated with the statistically similar legitimate visual characteristics; and
   responsively recording that the unauthenticated web content is illegitimate.

2. The method of claim 1, further comprising:
   simulating user interaction with the unauthenticated web content to access additional linked content;
   generating, using the HTML5-compatible background browser, an additional background browser image from the additional linked content; and
   repeating the identifying, determining, and recording steps for the additional background browser image.

3. The method of claim 2, wherein simulating user interaction comprises at least one of: simulating a mouse movement, simulating a mouse click, and simulating a keystroke.

4. The method of claim 1, wherein the neural network is trained using both legitimate browser images and known phishing browser images.

5. The method of claim 4, wherein training the neural network comprises:
   receiving phishing content from phishing website URLs and phishing kits;
   generating a set of phishing browser images from the phishing content using the HTML5-compatible background browser;
   segmenting and classifying the set of phishing browser images; and
   training the neural network using the segmented and classified set of phishing browser images and the set of legitimate browser images.

6. The method of claim 1, further comprising:
determining that the unauthenticated web content includes interactive fields configured to receive user information; and
wherein recording that the unauthenticated web content is illegitimate is performed only after determining that the unauthenticated web content includes the interactive fields.

7. The method of claim 1, further comprising:
determining that graphics of the unauthenticated web content are not in a graphics blacklist; and
wherein recording that the unauthenticated web content is illegitimate is performed only after determining that the graphics are not in the graphics blacklist.

8. The method of claim 1, wherein the email message is one of a text message, an email, or an in-app notice.

9. The method of claim 1, wherein generating the legitimate browser images and the background browser image comprises processing the respective legitimate and unauthenticated web content with the HTML5-compatible background browser to create images identical to those that would be displayed by a browser configured to display HTML5 content on an interactive screen.

10. The method of claim 1, further comprising:
receiving second unauthenticated web content;
determining that a URL of the second unauthenticated web content is on a URL blacklist; and
responsively recording a second phishing attack.

11. The method of claim 1, wherein the unauthenticated web content includes a button, dialog box or animation linking to an unauthenticated URL, and wherein generating the background browser image comprises:
accessing the unauthenticated URL to retrieve second unauthenticated web content; and
generating the background browser image from the second unauthenticated web content.

12. The method of claim 1, further comprising:
recording the phishing attack in response to determining that:
1) the background browser image has no similarity to an image of the set of legitimate browser images,
2) the unauthenticated web content includes no links to additional URLs, and
3) the unauthenticated web content includes at least one of a reference to a monitored brand or an interactive field configured to receive user information.

13. The method of claim 12, wherein the reference to a monitored brand comprises a brand logo image.

14. The method of claim 1, further comprising:
receiving second unauthenticated web content;
generating a second background browser image from the second unauthenticated web content; and
generating a safe link notice in response to determining that:
1) the second background browser image has no similarity to an image of the set of legitimate browser images,
2) the second unauthenticated web content includes no links to additional URLs, and
3) the second unauthenticated web content includes neither a reference to a monitored brand nor an interactive field configured to receive user information.

15. The method of claim 1, further comprising:
receiving from a message server additional content;
determining from the additional content a characteristic of content familiar to a content recipient;
generating test phishing content that includes the characteristic of familiar content; and
delivering the test phishing content as a message to the content recipient.

16. The method of claim 1, wherein recording that the unauthenticated web content is illegitimate comprises at least one of:
sending a modification of the unauthenticated web content to a content recipient,
transmitting a warning message, and
adding an entry with a TLD of the unauthenticated web content to a phishing blacklist database.

17. The method of claim 1, further comprising:
determining that an unauthenticated web content visual characteristic is not identical to a legitimate visual characteristic but has a statistical similarity to a visual characteristic of a known phishing attack; and
wherein recording that the unauthenticated web content is illegitimate is performed only after determining the statistical similarity to the known phishing attack.

18. The method of claim 1, further comprising:
receiving additional unauthenticated web content;
determining that the additional unauthenticated web content is not similar to a phishing attack and has a TLD not included in the plurality of legitimate TLDs;
adding the additional unauthenticated web content to the set of legitimate web content; and
re-training the neural network using the updated set of legitimate web content.

19. A system for detecting phishing attacks, comprising:
a processor;
memory including instructions that when executed on the processor perform a method comprising:
acquiring a set of legitimate web content from multiple webpages hosted at a plurality of legitimate top-level domains (TLDs);
generating, using an HTML5-compatible background browser, a set of legitimate browser images from the set of legitimate web content, wherein the legitimate browser images are bit-map images stored in the memory without displaying content on an interactive display;
determining, using a neural network, a set of legitimate visual characteristics from the set of legitimate browser images;
accessing a hyperlink embedded within an email message in a user's email inbox;
generating, using the HTML5-compatible background browser, a background browser image from unauthenticated web content associated with the hyperlink;
identifying, using the neural network, a statistical similarity between visual characteristics of the background browser image and the set of legitimate visual characteristics;
determining that a domain of the unauthenticated web content does not match any of the plurality of legitimate TLDs associated with the statistically similar legitimate visual characteristics; and
responsively recording that the unauthenticated web content is illegitimate.

20. The system of claim 19, wherein the method further comprises:
simulating user interaction with the unauthenticated web content to access additional linked content;
generating, using the HTML5-compatible background browser, an additional background browser image from the additional linked content; and
repeating the identifying, determining, and recording steps for the additional background browser image.

21. The system of claim 19, wherein the neural network is trained using both legitimate browser images and known phishing browser images.

22. The system of claim 21, wherein training the neural network comprises:
receiving phishing content from phishing website URLs and phishing kits;
generating a set of phishing browser images from the phishing content using the HTML5-compatible background browser;
segmenting and classifying the set of phishing browser images; and
training the neural network using the segmented and classified set of phishing browser images and the set of legitimate browser images.

23. The system of claim 19, wherein the method further comprises:
determining that the unauthenticated web content includes interactive fields configured to receive user information; and
wherein recording that the unauthenticated web content is illegitimate is performed only after determining that the unauthenticated web content includes the interactive fields.

24. The system of claim 19, wherein generating the legitimate browser images and the background browser image comprises processing the respective legitimate and unauthenticated web content with the HTML5-compatible background browser to create images identical to those that would be displayed by a browser configured to display HTML5 content on an interactive screen.

25. The system of claim 19, wherein the method further comprises:
receiving second unauthenticated web content;
determining that a URL of the second unauthenticated web content is on a URL blacklist; and
responsively recording a second phishing attack.

26. The system of claim 19, wherein the method further comprises:
recording the phishing attack in response to determining that:
1) the background browser image has no similarity to an image of the set of legitimate browser images,
2) the unauthenticated web content includes no links to additional URLs, and
3) the unauthenticated web content includes at least one of a reference to a monitored brand or an interactive field configured to receive user information.

27. The system of claim 19, wherein the method further comprises:
receiving from a message server additional content;
determining from the additional content a characteristic of content familiar to a content recipient;
generating test phishing content that includes the characteristic of familiar content; and
delivering the test phishing content as a message to the content recipient.

28. The system of claim 19, wherein recording that the unauthenticated web content is illegitimate comprises at least one of:
sending a modification of the unauthenticated web content to a content recipient,
transmitting a warning message, and
adding an entry with a TLD of the unauthenticated web content to a phishing blacklist database.

29. The system of claim 19, wherein the method further comprises:
receiving additional unauthenticated web content;
determining that the additional unauthenticated web content is not similar to a phishing attack and has a TLD not included in the plurality of legitimate TLDs;
adding the additional unauthenticated web content to the set of legitimate web content; and
re-training the neural network using the updated set of legitimate web content.

30. A non-transitory computer-readable storage medium including instructions that when executed on a processor perform a method for detecting phishing attacks, the method comprising:
acquiring a set of legitimate web content from multiple webpages hosted at a plurality of legitimate top-level domains (TLDs);
generating, using an HTML5-compatible background browser, a set of legitimate browser images from the set of legitimate web content, wherein the legitimate browser images are bit-map images stored in memory without displaying content on an interactive display;
determining, using a neural network, a set of legitimate visual characteristics from the set of legitimate browser images;
accessing a hyperlink embedded within an email message in a user's email inbox;
generating, using the HTML5-compatible background browser, a background browser image from unauthenticated web content associated with the hyperlink;
identifying, using the neural network, a statistical similarity between visual characteristics of the background browser image and the set of legitimate visual characteristics;
determining that a domain of the unauthenticated web content does not match any of the plurality of legitimate TLDs associated with the statistically similar legitimate visual characteristics; and
responsively recording that the unauthenticated web content is illegitimate.

* * * * *